3,105,848
COMPOUNDS 4-CHLORO-M-PHENYLENE DI-
METHYL CARBAMATE AND N,N'-DICHLO-
RO ISOPHTHALAMIDE
Jerome Linder, Niagara Falls, Jack S. Newcomer, Wilson,
and Keith J. Smith, Lockport, N.Y., assignors to
Hooker Chemical Corporation, Niagara Falls, N.Y., a
corporation of New York
No Drawing. Filed May 2, 1960, Ser. No. 25,844
3 Claims. (Cl. 260—471)

This invention relates to a new method for the preparation of carbamates. More particularly the concept of this invention resides in improved methods for the preparation of carbamates from the amides of aromatic polycarboxylic acid. This application is a continuation-in-part of S.N. 729,046, filed in the United States Patent Office on March 31, 1958, now U.S. 2,943,108.

It has been known prior to this invention that carbamates could be prepared from amides by chlorination of said amides in the presence of an alcohol and a strong base. The strong bases employed were the metal alkoxides or the alkali metal hydroxides. Such bases caused many side reactions in the yields of carbamates by prior art processes have always been unsatisfactory and for these reasons the reaction has not found commercial utility.

It has been found by this invention that a major improvement in the production of carbamates from amides is made by the use of a weak base instead of the strong bases taught from the prior art. The weak bases, which we have found to have these properties are the alkali metal and alkaline earth carbonates ($CO_3^-$), bicarbonates ($HCO_3^-$), borates ($HB_2O_4^-$) and ($B_2O_4^{--}$), phosphates ($PO_4^{---}$), monohydrogen phosphates ($HPO_4^{--}$), hydrogen phosphites ($HPO_3^-$), hydrogen arsenates ($HA_5O_3^{---}$)

cyanides ($CN^-$), silicates, cyanurates, etc. and also the alkaline earth hydroxides, oxides and alkoxides. The ionization constants of the acids of these anion are greater than $1 \times 10^{-12}$ except the hydroxides and oxides. Specifically excluded from these weak bases are the strong bases, that is, the alkali metal oxides, hydroxides, alkoxides, etc. Alkali metal cations to be included within the scope of this invention are: Lithium ($Li^+$), sodium ($Na^+$), potassium ($K^+$), rubidium ($Rb^+$), and cesium ($Cs^+$). Those cations which for the purpose of this invention are to be considered as alkaline earth cations are: Magnesium ($Mg^{++}$), calcium ($Ca^{++}$), zinc ($Zn^{++}$), barium ($Ba^{++}$), and aluminum ($Al^{+++}$). The weak bases to be used in the process of this invention are therefore materials such as sodium carbonate, potassium carbonate, sodium bicarbonate, sodium borate, calcium oxide, calcium hydroxide, barium hydroxide, and mixtures thereof. And of these weak bases, we prefer to use sodium carbonate (ordinary commercial soda ash) mainly for the reason that it is the cheapest material of those from which to select. The reaction using soda ash is illustrated by the below equation:

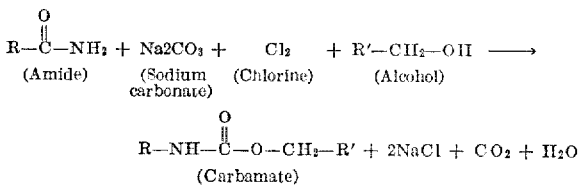

The preferred halogenating agent is chlorine.
Preferred alcohols to be embraced within the scope of this invention can be defined as

R'—CH$_2$—OH wherein R' is selected from the group consisting of hydrogen, nitrogen, and organic radicals. Among the alcohols which are embraced within the preferred scope of this invention are aliphatic acyclic alcohols, such as methanol, ethanol, propanol, butanol, pentanol, hexanol, heptanol, allyl alcohol, methallyl alcohol, crotyl alcohol, octanol, nonanol, decanol, undecyl alcohol, dodecyl alcohol, tetradecyl alcohol, cetyl alcohol, octadecyl alcohol, ethyl hexanol and the like; aliphatic cyclic alcohols, such as cyclohexanol, cyclobutylcarbinol, cyclopentanol, furfuryl alcohol, tetrahydrofurfuryl alcohol and the like; aromatic alcohols, such as benzyl alcohol, biphenyl carbinol, methylphenyl carbinol, phenyl ethyl alcohol, and the like; substituted alcohols such as chloropropanol, alcohols of general formula HO—CH$_2$CH$_2$—X where X may be thiocyano, chloro, bromo, lower alkyl, cyano, carboxy, etc., ethoxy ethyl alcohol, butoxy ethanol, ethylenechlorohydrin, 2-chloropropanol, 2-bromoethanol, dichloropropanol, and the like. Among the substituent groups which we contemplate using on any of the alcohols to be used in affecting the process of this invention are carboxy, fluoro, bromo, methyl, methoxy, ethyl, ethoxy, trifluoromethyl, nitro, chloro, chloromethyl, dichloromethyl, trichloromethyl, and the like. Also to be included among the preferred alcohols of this invention are polyhydric alcohols, such as, ethylene glycol, propylene glycol, butylene glycol, 1,2-propanediol, glycol, polyethylene glycols, substituted derivatives thereof, and the like. In these cases the ester (carbamate) produced may contain no hydroxy groups or may be a hydroxy ester. When unsaturated aliphatic alcohols are employed, some reaction between the halogen and the unsaturated alcohol takes place. Therefore, we prefer to employ saturated alcohols or substituted unsaturated alcohols where the substituent tends to inactivate the unsaturated group to further halogenation under the reaction conditions utilized in affecting the process of this invention.

Under certain conditions secondary alcohols can also be embraced within the scope of this invention. Such secondary alcohols are isopropanol, sec-butanol, sec-amyl alcohol, sec-hexyl alcohol, sec-octyl alcohol, sec-nonyl alcohol, and the like.

The product, carbamates, to be included within the scope of this invention are the compounds having the general formula

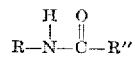

where R is an organic radical attached directly to the nitrogen atom by a carbon atom in the organic radical, and R" is an organic radical attached directly to the carbon atom selected from the group consisting of oxygen and nitrogen. Thus, for the purpose of this invention urea-type compounds are to be included within the scope of the definition of the broad term "carbamate."

The method of this invention comprises introducing the chlorine at a ratio optimately of at least one molar equivalent of chlorine per mole equivalent of amide to be converted, i.e. for a diamide where it is desired to convert only one amide group in the molecule about one mole of chlorine would be used; for a diamide where it is desired to convert both amide groups, two moles of chlorine would be used. It is possible to use more chlorine if desired to introduce chlorine elsewhere in the molecule. If less than these optimal amounts of chlorine were used the yields would in general be reduced.

The quantity of weakly basic reagent to be used is preferably at least two equivalents per each molecular part of chlorine which is employed. An amount of basic reagent in excess of these requirements, e.g. slightly greater than two equivalents per mole of halogen, is often desirable in order to obtain maximum conversions. As much as twelve equivalents of basic reagent per mole of halogen have been used without appreciably affecting the yield; however such practice is not preferred because of economical consideration.

The weakly basic ingredient may be anhydrous or may contain considerable quantities of water. For example, high yields of carbamates have been obtained using soda ash which contains as much as seventeen percent water. However, since soda ash is produced commercially in 99.5 percent purity, substantially anhydrous soda ash is favored for use.

The temperature conditions for the conversion of amides to carbamates may be varied considerably when using a weaker base, as defined, for promoting the reaction. The halogen has been introduced in the reaction mixture to effect the conversion at temperatures varying from zero degrees centigrade to one hundred and twenty-five degrees centigrade. When the halogen is introduced at temperatures below forty degrees centigrade, it is necessary that during the latter part of the reaction heat be applied at least to forty degrees centigrade, and preferably to fifty to seventy degrees centigrade in order to effect the reaction substantially to completion. Temperatures of one hundred to one hundred and twenty-five degrees centigrade are higher than usually required, although good yields may be obtained under these conditions. When using a chlorinated alcohol, such as ethylene chlorohydrin or dichloropropanol, temperatures of one hundred to one hundred and twenty-five degrees centigrade cause appreciable side-reaction of the weakly basic ingredient with the alcohol. This undesirable feature is avoided by operating at temperatures preferably not exceeding about seventy degrees centigrade. As a general rule, maximum operating temperatures of about eighty degrees centigrade are preferred, the halogen being introduced below this temperature and above forty degrees centigrade. When the halogen is introduced at temperatures below about forty degrees centigrade followed by application of heat to fifty to eighty degrees centigrade, a decrease in yield of carbamate is usually obtained, however, this method of operation is sometimes required to secure the desired carbamate. For example, when ethylene chlorohydrin is used as the alcohol, the temperature conditions are important in determining the type of carbamate which is obtained. By operating at temperatures at between fifty and one hundred and twenty-five degrees centigrade, even when only one mole of halogen is used per mole of amide, there is obtained considerable unreacted amide and the product unexpectedly is found to contain one chlorine atom in addition to the total of the chlorine atoms in the amide and the ethylene chlorohydrin. However, if the halogen is introduced at temperatures below about thirty degrees centigrade, preferably at zero to ten degrees centigrade, and the reaction mixture is added gradually to a heated zone maintained at sixty to eighty degrees centigrade, there is obtained an excellent yield of carbamate containing the same number of chlorine atoms as the total of such atoms in the amide and the ethylene chlorohydrin.

In the practice of this invention, the halogen is the last ingredient added in any order which is most convenient. For example, the amide may be added to an alcoholic suspension of the weakly basic ingredient, the weakly basic ingredient may be added to a solution of the amide in alcohol, or the alcohol may be added to a mixture of the weakly basic ingredient and amide. When using a chlorinated alcohol, it is preferable to combine the amide and alcohol, heat or cool to the desired reaction temperature, then add the weakly basic ingredient and finally add the halogen. This procedure is preferred in the case of the use of chlorinated alcohols, since the weakly basic reagent has less opportunity to react with the chlorinated alcohol.

Upon conclusion of addition of the halogen, the reaction mixture may be processed by a variety of procedures which are not critical to the invention. The entire reaction mixture has been added to water, which dissolves the inorganic material, dilutes the alcohol, and precipitates the carbamate. Another method involves evaporation of the alcohol, both with and without the addition of a hydrocarbon to effect azeotropic distillation. When a hydrocarbon, such as benzene, toluene, xylene, and chlorobenzene are employed, an excess of such material is used so that upon complete removal of the alcohol the mixture consists of a suspension of inorganic material in a hydrocarbon containing the carbamate in solution. The carbamate is readily recovered by filtration and crystallization, by washing out the inorganic material with water followed by crystallization of the organic layer, or simply by water washing to leave the carbamate in a hydrocarbon solution suitable for use as such. None of these operational procedures are critical to the practice of the invention.

The prior application of which this is a continuation-in-part presents a number of examples which distinguish the process using weak bases from the prior art processes which use strong bases. It has been found the advantages of the process of this invention are thoroughly applicable to the preparation of carbamates from the amides of aromatic polycarboxylic acids. It has further been found that our new process can be applicable to the preparation of certain new and useful compositions of matter from the amides of aromatic polycarboxylic acid groups. By amides is meant compounds having the functional group —CO—NH$_2$ known as carbamide. Among the amides of aromatic carboxylic acids may be mentioned phthalamide, isophthalamide, terephthalamide, the triamides of benzene tricarboxylic acids, the tetramides of benzene tetracarboxylic acids, and in general the di-, tri- or higher amides of benzene tetra-, penta-, or hexa-carboxylic acids. The benzene ring insofar as it possesses carbon atoms not occupied by a carbamino may be substituted by other groups such as halogen, alkyl, nitro, sulfonyl, alkylene, sulfo, carboxy, carbalkoxy, phenyl, benzyl and the like. It should be understood that if a strongly acidic substituent such as sulfo is located on the starting amide it will be necessary to employ one more molar equivalent in a base to neutralize said substituent. Weakly acidic groups such as sulfamido for example can be tolerated without need for extra base to neutralize such groups.

The carbamates derived from the amides of aromatic polycarboxylic acids are useful as pesticides and chemical intermediates. For example, the following transformations are possible:

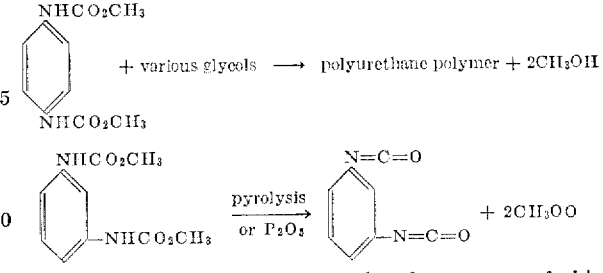

Thus, the urethans produced by the process of this invention might be applied to alkyds, polyesters, and in general any polymer field which involves the use of di or tri carboxylic acids, anhydrides, acid chlorides, amides, imides or other derivatives of dicarboxylic acids. The potentialities of economical methods for preparing di-urethans and polyurethans will be readily recognized by one skilled in the art of polymer production. Already certain of the polymers have been useful as fibers for bristles, ladies hosiery, protective clothing, lacquers, fast drying oils, molding compounds, plastic foam, and adhesives.

The following examples are given to illustrate the general methods for making representative compounds of this invention, but we do not wish to be specifically limited thereto except as defined in the appended claims.

Example 1

Isophthalamide (one mole) was stirred with four moles of soda ash in four liters of methanol at sixty-four to sixty-six degrees centigrade. Chlorine gas was bubbled in until one hundred and fifty-six grams (2.2 moles) had been introduced. About one hour was required. After the chlorine stream was discontinued, the reaction mixture was refluxed for thirty minutes and filtered while hot. Some unreacted isophthalamide is thereby removed. The filtrate was evaporated to dryness, the resultant solids washed with water, and then treated with hot methanol and filtered. The insoluble solids were recrystallized from benzene to obtain in good yield a crystalline product, melting point one hundred and thirty-six to one hundred and thirty-nine degrees centigrade, having the correct analytical and infrared spectral properties for dimethyl x-chloro-N,N'-(1,3-phenylene)bis-carbamate, which we believe has the structure I (dimethyl-4-chloro-N,N'-(1,3-phenylene)bis carbamate).

(I)
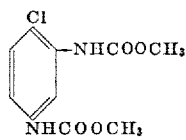

The methanolic filtrate on concentration and cooling yielded a small amount of a colorless crystalline solid, melting point one hundred and seventy-five to one hundred and seventy-six degrees centigrade having the correct analysis and infrared spectral properties expected for methyl N-(3-carbamidophenyl)carbamate (II)

(II)
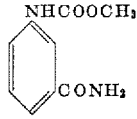

By the use of lesser amount of chlorine approximately one mole per mole of isophthalamide, compound II can be made to be predominate.

Example 2

This example illustrates the stepwise carrying-out of the process, wherein the amide is chlorinated to an N-chloroamide in the presence of the weak base and then the N-chloroamide reacted with an alcohol plus a weak base to form the carbamate.

One-quarter mole of isophthalamide and one-half mole of soda ash were stirred in five hundred cubic centimeters of dry nitrobenzene at twenty-five to thirty-five degrees centigrade, and one-half mole of chlorine gas was slowly introduced. The mixture was then heated to eighty degrees centigrade and held at this temperature for thirty minutes, then filtered while hot. The solids thus obtained were washed free of inorganic salts by washing with water. The remaining solid was found to be unreacted isophthalamide which could be recycled to the next batch. The nitrobenzene filtrate was evaporated under water-pump vacuum. The residual solid was slurried with a little benzene and filtered, to obtain a solid crystalline product, melting point one hundred and eighty-one to one hundred and eighty-two degrees centigrade. The product was shown to be N,N'-dichloroisophthalamide by the dicarbamate synthesis described below. The compound also liberated the theoretical amount of iodine when dissolved in a potassium iodide solution in acetic acid, further substantiating the N,N'-dichlorinated structure.

To a stirred solution of 0.05 mole of sodium carbonate in one hundred and fifty cubic centimeters of methanol at reflux was added slowly 0.05 mole of N,N'-dichloroisophthalamide. After the amide was added, the mixture was refluxed for one hour, and then filtered.

The filtrate was evaporated to dryness leaving a solid which was washed free of inorganic salts by means of water. The residual solid was shown to be dimethyl N,N'-m-phenylene-biscarbamate by mixed melting point with an authentic sample, melting point one hundred and fifty-seven degrees centigrade, prepared by addition of methanol to m-phenylenediisocyanate. Good yields were obtained in both steps of the process based on the unrecovered starting material.

Example 3

The pesticidal utility of the compounds of the invention is shown by the following test: the compounds I and II of Example 1 and N,N'-dichloroisophthalamide (Example 2) were dispersed as finely-divided solids in water at a concentration of four hundred parts of the compound in one million parts of water. Each of these dispersions was sprayed onto the foilage of tomato plants infected with spores of *Alternaria solani* (causative of "early blight disease").

At a time when similarly infected but unsprayed control plants were showing evidence of severe damage by early blight disease, the treated plants were substantially free of disease symptoms.

Although this invention has been illustrated by various examples embraced within the scope of this invention, it is to be understood that various modifications within this invention are possible, some of which have been referred to above. These modifications are meant to be embraced within the scope of this invention.

The novel carbamates of the invention as well as the N,N'-dichloroisophthalamide can be reacted with dialkyl amines and with cyclic secondary amines such as morpholine to give new ureas, also of herbicidal and pesticidal value.

We claim:

1. A compound selected from the group consisting of 4-chloro-m-phenylene dimethyl carbamate and N,N'-dichloro isophthalamide.
2. 4-chloro-m-phenylene dimethyl carbamate.
3. N,N'-dichloroisophthalamide.

References Cited in the file of this patent

UNITED STATES PATENTS

| | | |
|---|---|---|
| 2,860,166 | Newcomer et al. | Nov. 11, 1958 |
| 2,943,108 | Newcomer et al. | June 28, 1960 |

FOREIGN PATENTS

| | | |
|---|---|---|
| 185,371 | Austria | Apr. 25, 1956 |

OTHER REFERENCES

Bogert et al.: "Journal of the American Chemical Society," vol. 24, pages 693–702 (page 695 relied on), 1912.

Adams et al.: "Journal of the American Chemical Society," vol. 74, pages 3029–3032 (page 3030 relied on), 1952.

Beilstein: Handbuch der organischen Chemie (4th ed.), vol. 9, pages 834–835, 268 (1926).

Blanksma et al.: "Recueil des Travaux Chimique des Pays-Bar," vol. 66, pages 353–364, (pages 357–58 relied on), 1947.

Delaby et al.: "Academie des Sciences Comptes Rendus," vol. 239, pages 1089–91 (1954).

UNITED STATES PATENT OFFICE
CERTIFICATE OF CORRECTION

Patent No. 3,105,848  October 1, 1963

Jerome Linder et al.

It is hereby certified that error appears in the above numbered patent requiring correction and that the said Letters Patent should read as corrected below.

Column 4, line 60, for "$+2CH_3OO$" read -- $+2CH_3OH$ --.

Signed and sealed this 18th day of May 1965.

(SEAL)
Attest:

ERNEST W. SWIDER
Attesting Officer

EDWARD J. BRENNER
Commissioner of Patents